US007366759B2

(12) United States Patent
Trevithick et al.

(10) Patent No.: US 7,366,759 B2
(45) Date of Patent: Apr. 29, 2008

(54) METHOD AND SYSTEM FOR CHARACTERIZING RELATIONSHIPS IN SOCIAL NETWORKS

(75) Inventors: Paul Trevithick, Roslindale, MA (US); John H. Clippinger, Jefferson, NH (US)

(73) Assignee: Parity Communications, Inc., Chestnut Hill, MA (US)

( * ) Notice: Subject to any disclaimer, the term of this patent is extended or adjusted under 35 U.S.C. 154(b) by 480 days.

(21) Appl. No.: 10/080,878

(22) Filed: Feb. 22, 2002

(65) Prior Publication Data

US 2002/0116466 A1    Aug. 22, 2002

Related U.S. Application Data

(60) Provisional application No. 60/270,752, filed on Feb. 22, 2001.

(51) Int. Cl.
G06F 15/16    (2006.01)
(52) U.S. Cl. .................................. 709/206; 709/224
(58) Field of Classification Search ................ 709/238, 709/206, 219, 204, 203, 205, 224; 345/752; 707/2, 104.1; 715/753
See application file for complete search history.

(56) References Cited

U.S. PATENT DOCUMENTS

| | | | |
|---|---|---|---|
| 3,568,156 A | 3/1971 | Thompson ...................... 707/6 |
| 4,625,295 A | 11/1986 | Skinner ......................... 707/6 |
| 4,833,610 A | 5/1989 | Zamora et al. ................. 707/5 |
| 5,371,673 A | 12/1994 | Fan .............................. 704/1 |
| 5,544,305 A | 8/1996 | Ohmaye et al. ............. 715/776 |
| 5,722,418 A | 3/1998 | Bro ............................ 600/545 |
| 5,764,974 A | 6/1998 | Walster et al. ................ 707/6 |
| 5,913,212 A | 6/1999 | Sutcliffe et al. ............... 707/6 |
| 5,949,414 A * | 9/1999 | Namikata et al. ........... 715/753 |
| 5,956,667 A | 9/1999 | Higginbotham et al. ....... 704/1 |
| 5,960,173 A | 9/1999 | Tang et al. .................. 709/201 |
| 5,963,951 A | 10/1999 | Collins ....................... 707/102 |
| 6,006,188 A | 12/1999 | Bogdashevsky et al. .... 704/270 |
| 6,018,742 A | 1/2000 | Herbert, III ................. 707/102 |
| 6,023,729 A | 2/2000 | Samuel et al. .............. 709/228 |
| 6,055,494 A | 4/2000 | Friedman ....................... 704/9 |
| 6,076,100 A * | 6/2000 | Cottrille et al. ............. 709/203 |
| 6,115,709 A | 9/2000 | Gilmour et al. ................ 707/9 |
| 6,157,913 A | 12/2000 | Bernstein .................... 704/275 |
| 6,159,051 A | 12/2000 | Chang ........................ 439/630 |
| 6,173,261 B1 | 1/2001 | Arai et al. ................... 704/257 |
| 6,181,531 B1 | 1/2001 | Koshikawa et al. ..... 360/294.4 |

(Continued)

OTHER PUBLICATIONS

Takkinen et al, CAFE: A Conceptual Model for Managing Information in Electronic Mail, IEEE, 1998.*

(Continued)

*Primary Examiner*—Jungwon Chang
(74) *Attorney, Agent, or Firm*—Iandiorio & Teska (57) ABSTRACT

Relationships among members of a social network are automatically characterized by determining the pattern and purposes of electronic messages communicated between such members. By leveraging an organization's existing messaging infrastructure, the present invention can inexpensively and unobtrusively provide management with insights into interpersonal interactions that are either helpful or harmful to the performance of high-impact teams. Such insights are useful in mitigating human interactional problem areas, improving individual and group performance, and in team building and self-assessment or research activities.

28 Claims, 9 Drawing Sheets

U.S. PATENT DOCUMENTS

| | | | | |
|---|---|---|---|---|
| 6,185,527 | B1 | 2/2001 | Petkovic et al. | 704/231 |
| 6,192,343 | B1 | 2/2001 | Morgan et al. | 704/275 |
| 6,553,358 | B1* | 4/2003 | Horvitz | 706/45 |
| 6,557,027 | B1* | 4/2003 | Cragun | 709/204 |
| 6,578,025 | B1* | 6/2003 | Pollack et al. | 707/2 |
| 6,584,471 | B1* | 6/2003 | Maclin et al. | 707/104.1 |
| 6,594,693 | B1* | 7/2003 | Borwankar | 709/219 |
| 6,654,787 | B1* | 11/2003 | Aronson et al. | 709/206 |
| 6,772,196 | B1* | 8/2004 | Kirsch et al. | 709/206 |
| 6,832,245 | B1* | 12/2004 | Isaacs et al. | 709/206 |
| 6,978,292 | B1* | 12/2005 | Murakami et al. | 709/204 |
| 2003/0020749 | A1* | 1/2003 | Abu-Hakima et al. | 345/752 |
| 2003/0046421 | A1* | 3/2003 | Horvitz et al. | 709/238 |

OTHER PUBLICATIONS

Robert M. Losee, Jr, "Minimizing information Overload: The Ranking of Electronic Messages", Journal of Information Science, Jun. 28, 1998.*

Provisional application No. 60/255,016, Dec. 12, 2000.*

Provisional application 60/255,016, Dec. 12, 2000.*

"Studying On-Line Social Networks," Garton et al.; available web site http.ascusc.org/icme/vol3/issue1/garton.html; JCMC 3, Jun. 1, 1997, pp. 1-30.

"Social Relationships in Electronic Forums" by Kling; available web site: www.december.com/cmc/mag/1996/jul/kling.html; CMC Magazine, Jul. 1996; pp. 1-28.

"Intelligent Filtering of Computer-Mediated Human Communication" available web site www.dsv.su.se/%7Efk/if_Doc/IntFilter.html; pp. 1-4, 1997.

Anthropac Version 4.98, available web site www.analytictech.com/apacdesc.html; pp. 1-2, 2006.

"Independent Technical Review of the Carnivore System—Draft Report" Smith et al.; available web site http://www.usdoj.gov/jmd/publications/carnivore_draft_1.pdf; Nov. 17, 2000.

"Carnivore FAQ (Frequently Asked Questions)" by Robert Graham; available web site http://www.robertgraham.com/pubs/carnivore-faq.html; version 3, Oct. 6, 2001, pp. 1-23.

"Getting Past Carnivore" by sil; available web site http://Ijnuxnewbie.org/articles/carnivore.html, 2000.

"Security firm test FBI limits with e-mail surveillance tool" available web site http://www.cnn.com/2000/TECH/computing/09/19/email.surveillance.ap/index.html; Sep. 19, 2000, pp. 1-3.

"Codex Data Systems" available web site http://www.codexdatasystems.com/menu.html; pp. 1-2, 2000.

"Remote Control PC 2000" available web site http://www.system-detective.com/remotecontrolpc.html; pp. 1-4, No reference date available.

"Resoft International" available web site http://www.re-soft.com/customer/aetna.html; pp. 1-2, 1997.

"ZDNet Reviews" available web site http://www.zdnet.com/zdhelp/stories/main/0,4161,2631218-1.00.html, 2001.

* cited by examiner

| PRIMITIVE | DESCRIPTION |
|---|---|
| FYI | A INFORMS B OF SOMETHING |
| NOTE | A INFORMS B OF SOMETHING AND REQUIRES AN ACKNOWLEDGE MESSAGE BACK FROM B |
| ACKNOWLEDGE | A ACKNOWLEDGES SOMETHING IN RESPONSE TO A MESSAGE FROM B |
| COUNTER | B COUNTERS A PROPOSAL FROM A |
| REVERSE COUNTER | A COUNTERS B's COUNTER |
| DONE? | A ASSERTS THAT HE/SHE HAS SATISFIED B's REQUEST |
| COMMIT | A PROMISES TO DO SOMETHING FOR B |
| ACCEPT | A ACCEPTS AN OFFER OR COUNTER PROPOSAL FROM B |
| DECLINE | A DECLINES AN OFFER FROM B |
| OFFER | A OFFERS SOMETHING TO B |
| INVITE | A INVITES B TO BECOME A GROUP MEMBER |
| REDO? | A DECLARES TO B THAT HE/SHE REJECTS B's ASSERTION THAT B HAS FULFILLED B's PROMISE TO A |
| DONE | A DECLARES TO B THAT HE/SHE ACCEPTS B'S ASSERTION THAT B HAS FULFILLED B's PROMISE TO A |
| WITHDRAW | A WITHDRAWS HIS/HER REQUEST OF B |
| OPT OUT | B DECLARES THAT HE/SHE WILL NOT FULFILL B's PROMISE TO A |
| REQUEST | A REQUESTS B TO TAKE SOME ACTION |
| QUESTION | A REQUESTS B TO PROVIDE SOMETHING |
| ANSWER | B ANSWERS A's QUESTION |

FIG. 1

FYI PROTOCOL

FIG. 2A

NOTE PROTOCOL

FIG. 2B

OFFER PROTOCOL

FIG. 2C

INVITE PROTOCOL

FIG. 2D

QUESTION PROTOCOL

FIG. 2E

REQUEST PROTOCOL

METHOD AND SYSTEM FOR CHARACTERIZING RELATIONSHIPS IN SOCIAL NETWORKS

CROSS-REFERENCE TO RELATED APPLICATIONS

This claims priority to and the benefit of co-pending, U.S. provisional patent application No. 60/270,752, filed Feb. 22, 2001, the entirety of which is incorporated herein by reference.

TECHNICAL FIELD

The present invention relates to ascertaining the performance of a social network and more specifically to characterizing the interrelationships of individual members of the social network.

BACKGROUND

A social network refers to a set of social entities that interact and exchange information in a social relationship. Social entities include, for example, people, teams, groups, organizations, and countries, while social relationships refer to friendship, employment, or other relationships between these social entities. Dialogues between members of the social network, such as exchanges, promises, commitments, and other interactions that are necessary for a common business purpose or other activity, form and develop the social relationships between each entity in the social network.

Researchers, business managers, executives, social network participants, and other individuals and entities with a vested interest in the efficiency and success of a particular social network are concerned with monitoring and improving social relationships so as to optimize performance on the part of individuals and across the entire network. Traditional techniques for monitoring social relationships rely on manual data collection, such as questionnaires, interviews, observations, and self-assessment surveys, which are fraught with inaccuracies, unreliability, and subjectivity. While technological innovations have improved upon these manual techniques and now afford limited electronic monitoring capabilities, a continuing need exists for improved data gathering and interpretation techniques that automatically and objectively characterize the interactions between and among individuals and groups.

SUMMARY OF THE INVENTION

The present invention leverages an organization's existing messaging infrastructure (e.g., electronic mail) by monitoring electronic messages transmitted between social network participants. The invention characterizes the relationships in the social network by monitoring the dialogues of the network participants to determine emerging patterns of behavior, a purpose for each individual message in the dialogues, and the outcomes of these dialogues. The invention then uses this pattern, purpose, and outcome information to explicitly characterize the nature and quality of the relationships between each network participant.

In this manner, the invention enables, for example, individuals to see how their interactions with others are characterized as a set of objective metrics that capture the quality, depth, balance and accountability in relationships as sell as their response times and the quantity of their communications. These metrics provide individuals with feedback that can be used to adapt their own interactions in order to improve these metrics. Similarly, the close correlation between these metrics and individual and group performance enables management to intervene in ways to improve both individual and group performance. Management can also extend the criteria used to select members of a new group by including metrics generated by the invention for any candidates involved in prior social networks, together with each candidate's individual, technical skills. This expanded set of criteria thus provides management with an improved ability to gauge the likelihood that the interpersonal skills of each technically-qualified group member will result in a highly efficient and productive group. The metrics can also form the basis of compensation systems.

In one embodiment, a method performed in accordance with the invention characterizes relationships among members of a social network. The invention receives a plurality of messages (e.g., electronic mail messages) communicated during a dialogue between members of the social network, determines a "purpose" for each such message, and determines at least one "pattern" in the messages. The purpose determined for each message corresponds to a speech act (also known as a primitive) and/or a sequence of speech acts, which characterize the message as, for example, a note, an acknowledgement, a counter, a reverse counter, a complete, a commit, an acceptance, a decline, an offer, an invitation, a withdrawal, an opt-out, a request, or a question. Similarly, the pattern in the messages may correspond, for example, to a frequency of interaction, a latency in response, a latency in completion, a successful completion ratio, a nonresponsive ratio, an unsuccessful ratio, and/or a number of participating members until completion. The purposes of each message may be analyzed to determine the pattern in the messages. The relationships among the members of the social network are characterized, at least in part, based on the pattern and purposes of the messages.

The invention may select one of a plurality of purpose categories and embed indicia of the selected purpose category in a message. For example, the indicia may be embedded in, and later extracted from, the body section of the message and/or from the header section of the message. The invention assigns a score to each member of the social network participating in the dialogue based, at least in part, on the purpose determined for each of the messages transmitted by that particular member. The purpose can be further classified by type, such as favorable, unfavorable, or neutral. The invention increments the score assigned to particular participating members in response to favorable purposes associated with messages transmitted by that particular member and decrements the score in response to unfavorable purposes. The technique discussed above is preferably repeated for a plurality of dialogues between members of the social network and the score assigned to each such member is based on the set of messages transmitted by each member during the dialogues. These scores, together with the characterized relationships in the social network, can be used to assess the interactions within the existing social network, as well as to select members for a new social network.

A system for characterizing relationships among members of a social network in accordance with an embodiment of the invention includes a message transmission-reception process, a primitive-detection process, a pattern-detection process, and a group-performance process. A "process," as used herein, refers to software code that is executing within an execution environment of a digital data processor, such as a computer. The message transmission-reception process receives a plurality of messages communicated during a dialogue between members of the social network. The primitive-detection process determines a purpose for each of the messages by, for example, extracting indicia of such purpose from a body and/or header section of the message. The pattern-detection process classifies the determined purpose of each message as being of a favorable, unfavorable, or neutral type. In one version of this embodiment, a primitive/dialogue-selection process selects one of a plurality of purpose categories and embeds indicia of the selected purpose category in at least one of the messages. The pattern-detection process determines at least one pattern in the messages communicated during the dialogue by, for example, analyzing the purpose of each of the messages in the dialogue.

The group-performance process characterizes the relationships among the members of the social network based on the pattern and purposes of the messages. For example, the group-performance process may assign a score to each member of the social network participating in one or more dialogues based, at least in part, on the purpose of each of the messages transmitted by that participating member. The group-performance process increments and decrements the score assigned to particular participating members in response to favorable or unfavorable purpose types, as previously described.

In this manner, the present invention provides management and other interested parties with insights into interpersonal interactions that are either helpful or harmful to the performance of groups or entire organizations.

BRIEF DESCRIPTION OF THE DRAWINGS

The invention is pointed out with particularity in the appended claims. The advantages of this invention described above, and further advantages, may be better understood by reference to the following description taken in conjunction with the accompanying drawings, in which:

DETAILED DESCRIPTION OF THE PREFERRED EMBODIMENTS

The present invention recognizes that communication patterns between and among individuals and groups can be objectively determined and analyzed in order to ascertain the quality of human interactions that form the culture of a particular group. This information can then be used to target interpersonal problem areas (e.g., between pairs of particular individuals in the group) and thus, in aggregate, improve the overall group culture, which drives the responsiveness, productivity and innovation of the group.

Figure 1:
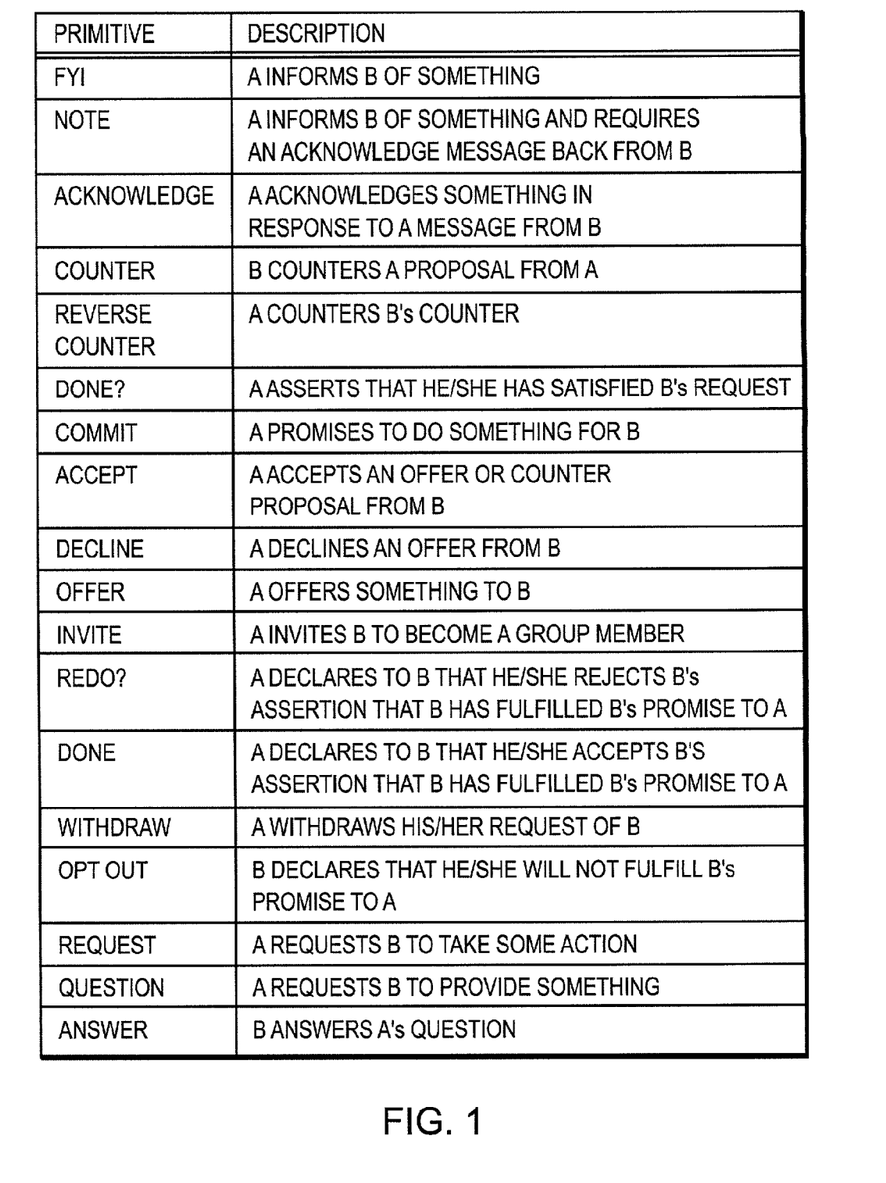
FIG. 1 provides illustrative examples of primitives that can be communicated between a pair of entities in accordance with an embodiment of the invention.

Communication patterns between entities can be determined from fundamental speech acts (hereinafter "primitives") embedded within messages that are communicated between the entities during particular dialogues. FIG. 1 provides illustrative examples of primitives that can be communicated between a pair of entities, "A" and "B." As the dialogue between the pair of entities progresses, the sequence of primitives embedded in the messages communicated between the parties forms a pattern (hereinafter "dialogue protocol"). The name of the dialogue protocol preferably matches the name of the primitive that initially spawned the dialogue.

Figure 2A:
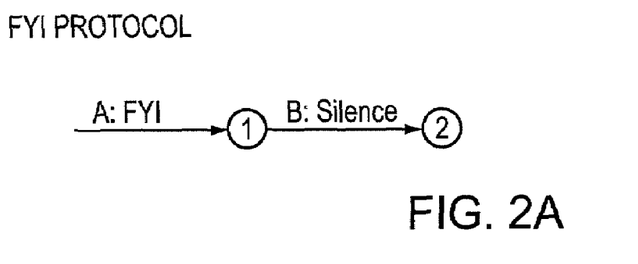
FIGS. 2A-2F provide illustrative examples of FYI, Note, Offer, Invite, Question, and Request dialogue protocols that can be supported by the present invention.
Figure 2B:
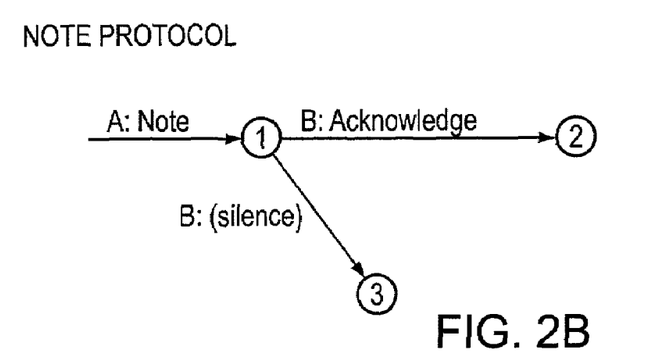
Figure 2C:
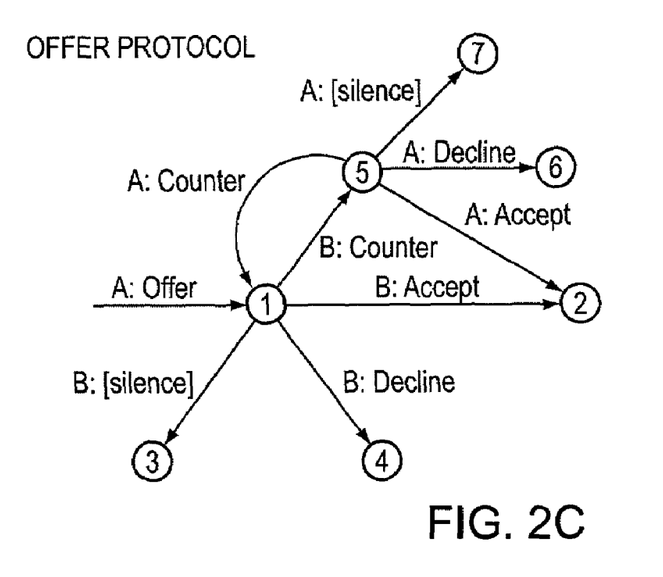
Figure 2D:
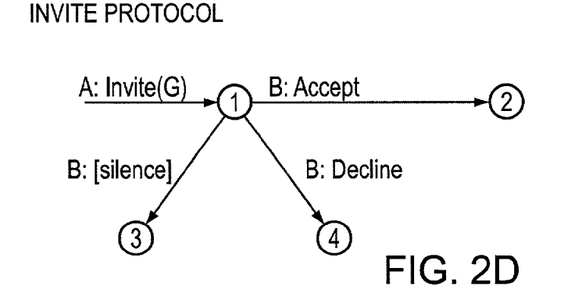
Figure 2E:
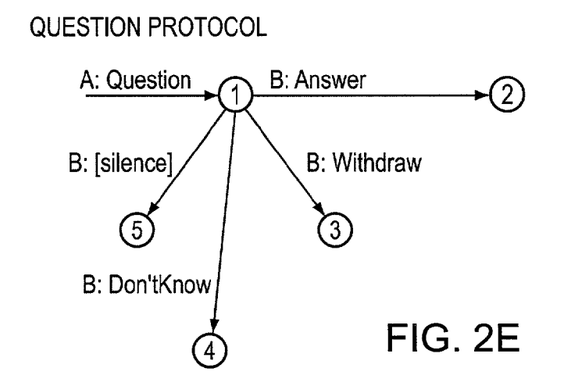
Figure 2F:
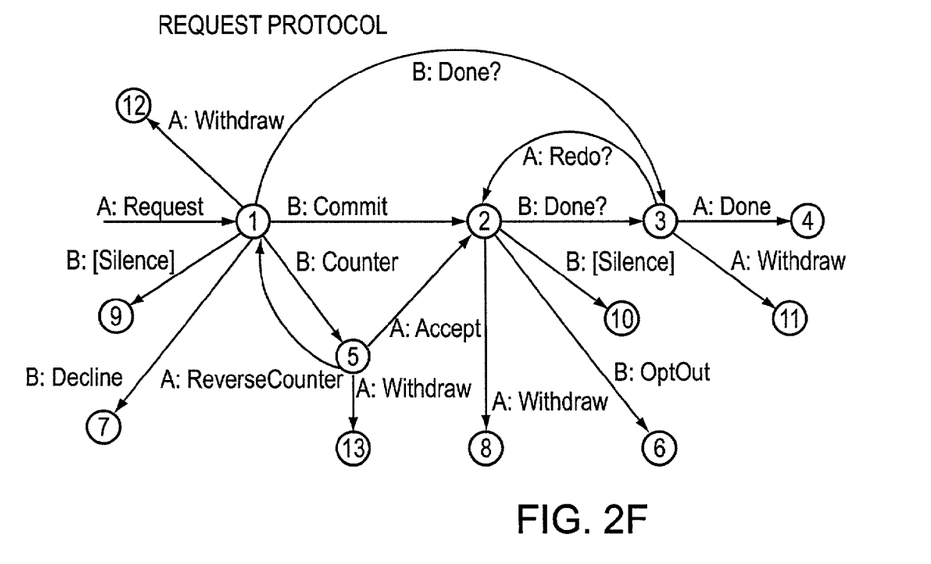

FIGS. 2A-2F provide illustrative examples of dialogue protocols that are supported by the present invention. FIG. 2A illustrates an FYI protocol in which entity A informs entity B about something in a message, and an FYI primitive is embedded therein. Since the FYI protocol does not require a response from B, this protocol only includes an FYI primitive in the depicted sequence to achieve the completed end state (2), hereinafter referred to as an "outcome." FIG. 2B illustrates a Note protocol in which entity A informs entity B about something and expects an Acknowledgement primitive to be used in return. Since this Note protocol requires an acknowledgement from entity B, there are two possible outcomes, (2) and (3). Outcome (2) is classified as a complete and favorable outcome and includes a Note and an Acknowledge primitive in the depicted sequence. Outcome (3) is classified as an incomplete and unfavorable outcome due to B's silence and failure to acknowledge A's message. Similarly, FIG. 2C illustrates an Offer protocol in which entity A offers something to entity B, with states 2-4 and 6-7 representing possible outcomes; FIG. 2D illustrates an Invite protocol in which entity A invites entity B to join a particular group, with states 2-4 as possible outcomes; FIG. 2E illustrates a Question protocol in which entity A requests that entity B provide certain information, with states 2-5 as possible outcomes; and FIG. 2F illustrates a relatively complex Request protocol in which entity A requests that entity B perform a particular action, with states 4 and 6-13 as possible outcomes.

Figure 3:
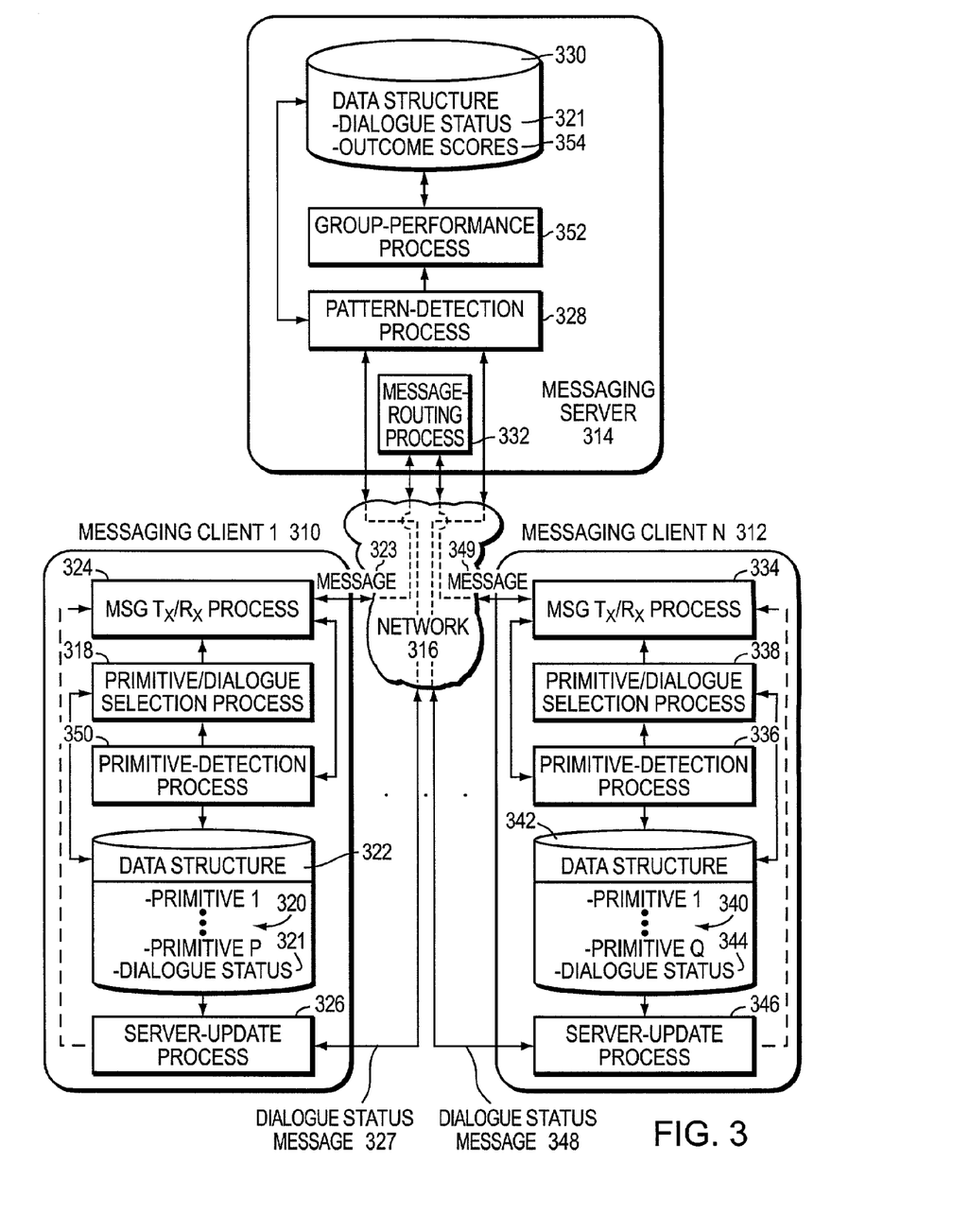
FIG. 3 is a block diagram of the data, messages, and processes operating in the messaging clients and messaging server of the present invention.

The present invention monitors the dialogue protocol and primitive information embedded in electronic messages, in order to characterize the interactions between particular entities in a group. With reference to FIG. 3, a system in accordance with an embodiment of the invention includes a plurality of messaging clients 310, 312, which convey electronic messages to each other via a messaging server 314 that is coupled to the messaging clients 310, 312 by a data communications network 316. Although the invention applies to all types of electronic messaging systems, the invention is preferably embodied as an enhanced electronic mail ("email") system that is capable of being implemented by introducing particular software modules into a group's existing email infrastructure, such as POP/IMAP and SMTP, Exchange, or Lotus Notes.

In one embodiment, each messaging client 310, 312 comprises one or more software processes that execute within an execution environment in a memory of a digital data processing device, such as a personal computer, computer workstation, pocket PC, personal digital assistant, WAP phone, or any other type of information appliance capable of operating as a thin client. Similarly, the messaging server 314 comprises one or more software processes that execute within an execution environment formed within a memory of a digital data processing device, such as an email server, application execution server, file server, web server, etc. The software processes of the messaging server 314 can also be executed within the execution environments of a plurality of distributed digital data processing devices. For example, software processes performing message routing activities can execute within an execution environment of an existing email system hosted on an application execution server, while other software processes performing interpretation and display activities can execute in a different execution environment on a remote server (e.g., as processes associated with a portal hosted by a particular web server). In some implementations, the software processes of the messaging server 314 can also be executed, entirely or partly, within the execution environment of the data processing devices hosting the messaging clients 310, 312. The data communications network 316 corresponds to any type of communications network capable of conveying electronic messages, such as a LAN, MAN, WAN, Internet, Intranet, etc.

Figure 4:
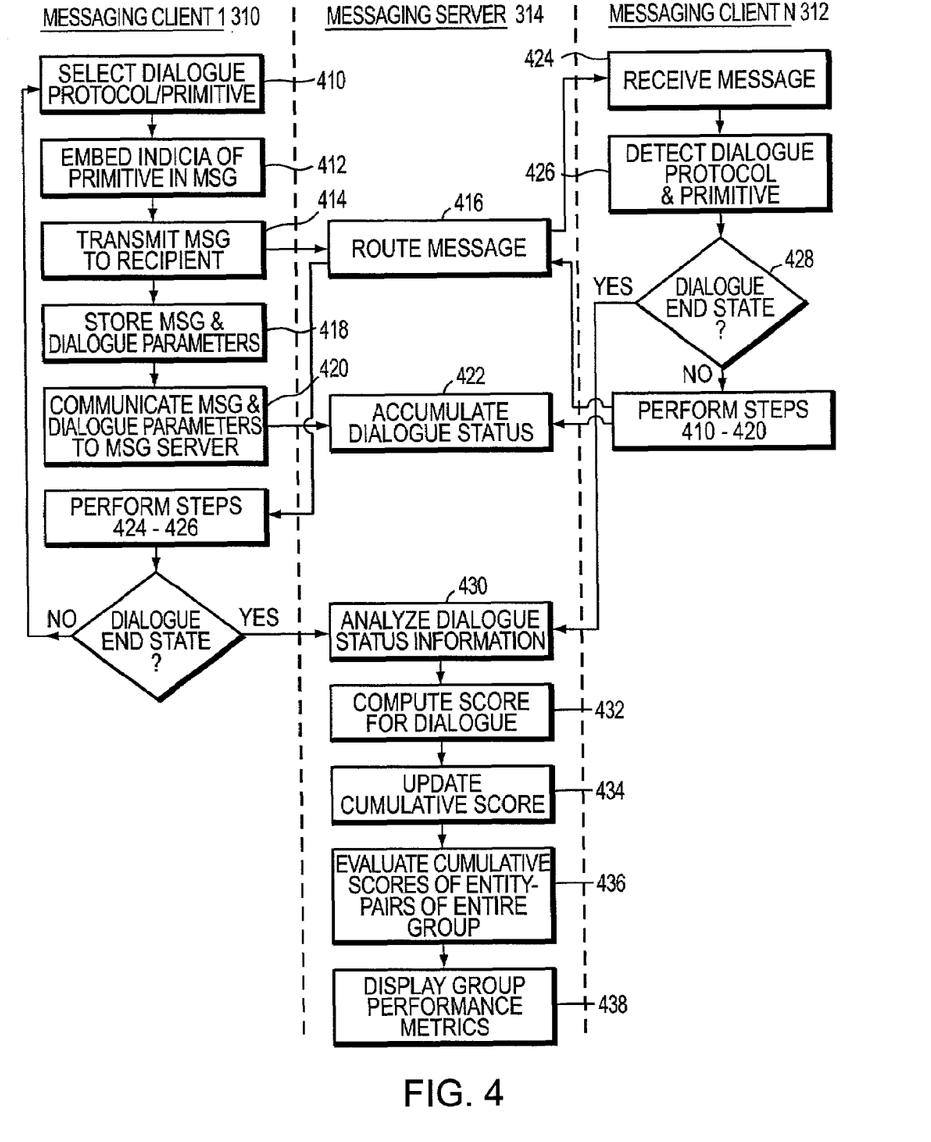
FIG. 4 is a flow diagram illustrating the steps performed by each of the processes of FIG. 3, in accordance with an embodiment of the invention.

In operation and also with reference to FIG. 4, a user (not shown) of the messaging client 310, who desires to initiate an email dialogue with a user (not shown) of the messaging client 312, selects "New" from a graphical user interface (GUI) of the messaging client 310, which signals a primitive/dialogue-selection process 318 of the messaging client 310 to access available primitive and dialogue protocol information 320 stored in a data structure 322 coupled to the messaging client 310 (step 410). Data structure 322 (like other data structures described herein) typically resides on a mass-storage device, such as a hard disk. The primitive/dialogue-selection process 318 displays the available information 320 in a drop-down list box or other GUI object so that the user can select the type of dialogue protocol that corresponds to the purpose of the email message. Alternatively, the type of dialogue protocol corresponding to the email message can be automatically and non-invasively determined by the primitive/dialogue-selection process 318 by analyzing the contents of the email message prior to its transmission. For example, the process 318 may search the message text for key words or phrases (e.g., "FYI," "please reply," etc.) indicative of the protocol.

Regardless of how the dialogue protocol is selected, the primitive/dialogue-selection process 318 embeds indicia of a corresponding primitive in the email message (step 412). This indicia corresponds, for example, to text, flags, or other identifiers that are embedded in the body and/or header of the email message (e.g., identifying a Question Protocol by embedding the letter "Q" in the subject line of the email message). This indicia can be inserted with or without the knowledge of the user and can be either visible or invisible in the GUI representation of the new email message. The primitive/dialogue-selection process 318 can also append to the email message an email header associated with the messaging server 314. This is useful when various software processes of the messaging server 314 are distributed across a plurality of digital data processing devices. Once the indicia have been embedded in the modified email message 323, the message-transmission/reception process 324 (hereinafter "msg-tx/rx process") transmits the modified email message 323 to a message-routing process 332 of the messaging server 314 (step 414), which routes the email message 323 to a msg-tx/rx process 334 of the messaging client 312 (step 416).

Concurrently with the transmission of the email message 323, the primitive/dialogue-selection process 318 stores message and dialogue parameters associated with the email message 324 in the data structure 322 (step 418). These parameters (referred to hereinafter as "dialogue status 321") include, for example, one or more identifiers of the selected dialogue protocol and embedded primitive, a timestamp, a state of the dialogue (analogous to the intermediate and end state conditions depicted in FIGS. 2A-2F), and the email addresses of the sender and recipient. The primitive/dialogue-selection process 318 also instantiates a state machine to track the progress and state of the dialogue initiated by the email message 323 and to update the dialogue status 321 as the dialogue progresses. A server-update process 326 executing preferably as a background task on the messaging client 310 detects the updated dialogue status 321 in the data structure 322, prepares a dialogue-status message 327 including the dialogue status 321, and transmits the dialogue-status message 327 to a pattern-detection process 328 of the messaging server 314 (step 420). The pattern-detection process 328 accumulates such dialogue status 321 relating to one or more email messages in a data structure 330 coupled to the messaging server 314 (step 422).

Meanwhile, the msg-tx/rx process 334 receives the email message 323 (step 424) and passes it to a primitive-detection process 336 on the messaging client 312, which extracts the indicia of the dialogue and primitive embedded in the email message 323 (step 426). The primitive-detection process 36 also instantiates a state machine to track the progress and state of the dialogue initiated by the email message 323 and to reflect message parameters, such as the name of the user who sent the email message 323, the time elapsed since receipt of the message 323, and the state of the message (e.g., whether the dialogue is complete, pending, etc.). The primitive-detection process 336 records the message parameters and dialogue state information as dialogue status 344 in a data structure 342 coupled to the messaging client 312.

When the user of the messaging client 312 responds to the email message 323 by, for example, selecting "Reply" on the GUI of the email system, a primitive/dialogue-selection process 338 of the messaging client 312 accesses the dialogue status 344 in the data structure 342 and the state machine to determine whether the dialogue associated with email message 323 has achieved an "end" state (step 428), such as any of states (2)-(5) in the Question Protocol of FIG. 2E. If the dialogue status indicates that the dialogue is at an intermediate state (i.e., not an outcome of the dialogue), such as at state (1) in FIG. 2E, then the primitive/dialogue-selection process 338 selects a particular set of primitives from a larger set of available primitives 340, which corresponds to valid transitions of the current dialogue protocol, and includes them in a drop-down list box or other graphical element in the GUI of the email system. For example and with reference to FIG. 2E, if the current dialogue protocol is a Question Protocol at state (1), then the valid transitions displayed in the drop-down list box include Answer and Don't Know.

Once the user of the messaging client 312 selects one of the valid transitions from the drop-down list box, the primitive/dialogue-selection process 338 embeds indicia of the corresponding primitive and dialogue into the reply email message 349 as previously described and instructs the msg-tx/rx process 334 to transmit the reply email message 349 to the message-routing process 332 on the messaging server 314 (steps 410-414), which forwards the message 349 to the msg-tx/rx process 324 of the messaging client 310 (step 416). The primitive/dialogue-selection process 338 also advances the state machine to the next state and updates the dialogue status 344 with the message and dialogue parameters (step 418). A server-update process 346 detects the updated dialogue status 344, forms a dialogue status message 348 that includes the dialogue status 344, and transmits the status message 348 to the pattern-detection process 328 of the messaging server 314 (step 420). As previously described, the pattern-detection process 328 accumulates the dialogue status 344 provided in the dialogue status message 348 in the data structure 330 (step 422).

The processes of the messaging client 310 respond similarly to those of messaging client 312 by receiving the message 349, detecting the dialogue protocol and primitive, determining the current state of the dialogue, embedding indicia of a selected primitive in response to valid transitions to the email message 349 as appropriate, advancing the state machine on the messaging client 310, and updating the data structures 322, 330 on the messaging client 310 and messaging server 314 as previously described. The interplay between and among the processes of the messaging clients 310, 312 and messaging server 314 continue until the dialogue reaches a terminal state or outcome.

The pattern-detection process 352 of the messaging server 314 detects the terminal state of the dialogue from the contents of the dialogue status message transmitted by the server-update process that encountered the terminal state and stores the updated dialogue status and parameters in the data structure 330. The pattern-detection process 352 then analyzes the dialogue status 321 recorded during the dialogue, in order to compute metrics useful in detecting one or more patterns in the dialogue and in characterizing the interactions of the dialogue (step 430). For example, the time-stamp information in the dialogue status 321 can be used to compute a latency-in-response (i.e., the time it takes for one user to respond to the email message of another user) between the two participants in the dialogue and a latency-in-completion of the dialogue (i.e., how long it takes to complete the dialogue). Similarly, the number of participating users in this and related dialogues is a measure of the degree of skill and quantity of information known by each participating member, as well as a measure of the "flatness" (e.g., levels in a corporate hierarchy) of the group. For example, a relatively small number of participating users in a particular dialogue may indicate that each such user has a relatively high level of knowledge and/or skill that enables requests in the email message to be serviced without relying on the inputs of many others. Similarly, a relatively small number of participating users may be indicative of the group's flatness, since messages transmitted within a group that has several levels of hierarchy typically requires the involvement of many intermediaries before the requests in such messages are properly serviced and the dialogue is brought to a closed state.

Further, the pattern-detection process 352 can access the dialogue status of a plurality of prior dialogues, together with the status of the current dialogue, between the same two participating users in order to determine their frequency of interaction, a successful or unsuccessful completion ratio (i.e., the percentage of time that the interactions between the a particular pair of users resulted in a successfully or unsuccessfully completed dialogue), a non-responsive ratio, and a measure of the directionality of the dialogue (e.g., whether one of the two users typically initiates the dialogue).

The dialogue status 321 also provides insights into the efficiency of the interactions that occurred during a particular dialogue. For example and with reference to the Question Protocol of FIG. 2E, the interactions resulting in the outcome of state (2) can be characterized as being favorable, since user B's answer directly terminated the dialogue without requiring intermediate transitions or new dialogues. Similarly, the interactions resulting in the outcome of state (4) may be deemed neutral or unfavorable depending upon the conventions agreed to by the members of the group. The interactions leading to outcome (5) would likely be characterized as being unfavorable due to user B's unresponsiveness. In this manner, the particular transitional path followed in a dialogue protocol, independently and/or coupled with the metrics and patterns described above, can be used by the pattern-detection process 328 to compute an outcome score 354 for each of the two participants in the current dialogue (step 432). The degree of positive or negative effect that these metrics, patterns, and/or transitional paths have on the outcome scores 354 can be based on the group conventions, which were established by the entity who initially formed the group and which were agreed to by each of the group members who accepted the invitation to join the group.

The pattern-detection process 328 also updates the prior outcome scores of the two user participants (generated as a result of prior dialogues between the user pair) by adding, subtracting, or otherwise incorporating the positive, negative, or neutral effect of the current outcome score with the prior outcome scores in order to provide a current representation of the relationship between the two users (step 434). In one embodiment, a group-performance process 352 of the messaging server 314 further characterizes the quantity and quality of the interactions in the group by evaluating the cumulative outcome scores for each user pair in the group and, based on a total or average of these scores, rates or otherwise characterizes the efficiency of the group (step 436). In one embodiment, the group-performance process 352 communicates with portal software, which enables the metrics, patterns, dialogue outcomes, and other information determined by the present invention to be displayed to group members via the Internet (step 438).

In one embodiment, the entity (e.g., a group administrator or any other individual with access to the systems and methods of the invention) who initially formed the group subscribing to a particular set of conventions, sends an email message inviting a plurality of member candidates to join the group, in accordance with the Invite Protocol depicted in FIG. 2D. The particular conventions to be agreed to and followed by the group members can be specified in the body of the email message and can be stored in the data structure 322 of each user's messaging client 310 and/or in the data structure 330 of the messaging server 314 upon acceptance by that particular user. In this manner, the conventions used to characterize the interactions of members within a group can be tailored to the specific needs, goals and environment of particular groups. In one embodiment, access to the scores, metrics, and pattern information determined for one or more of the group's members can be restricted by the group's conventions to group members or other authorized individuals.

Figure 5:
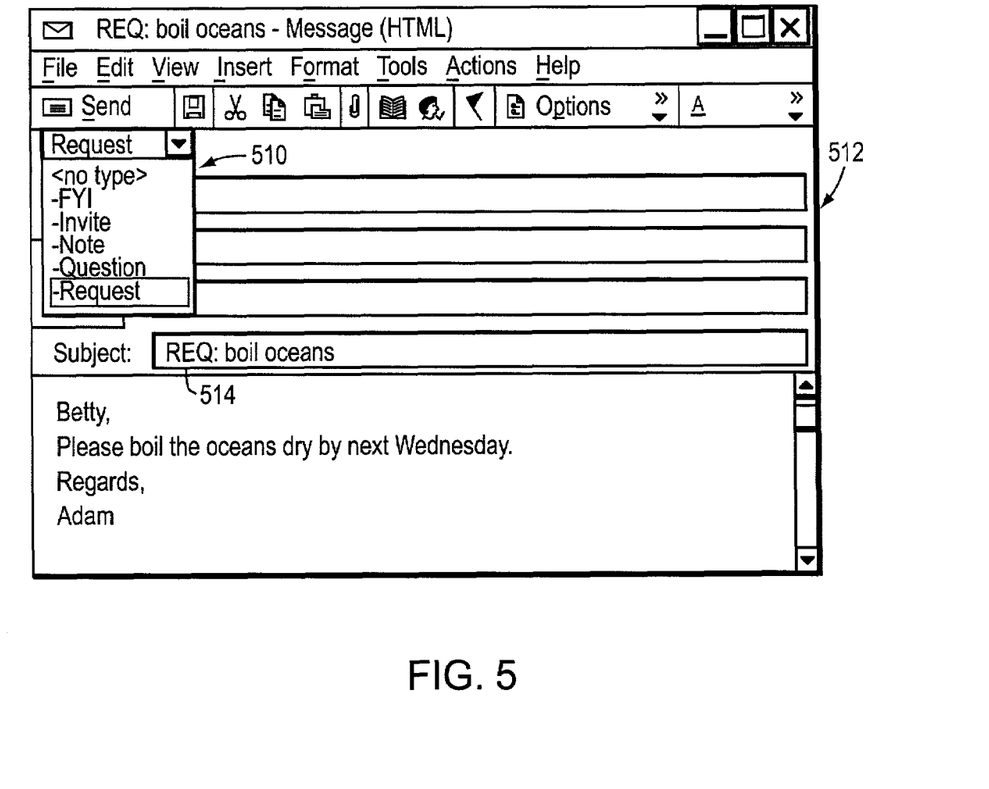
FIG. 5 provides a representation of the graphical user interface (GUI) of a new email message incorporating a drop-down list box populated with available primitive selections and illustrating exemplary indicia of a selected primitive in a subject line of the email message, in accordance with an embodiment of the invention.

With reference to FIG. 5 and as a non-limiting example, Adam initiates a Request Protocol (FIG. 2F) with Betty by selecting "Request" from the list of available primitives in a drop-down list box 510 in the GUI representation of a new email message 512. The primitive/dialogue-selection process 318 of Adam's messaging client 310 embeds the text "REQ" as indicia 514 of Adam's request into the subject line of the email message 512. Upon transmitting the email message 512 to Betty and copying himself on the message, Adam's inbox 610 (FIG. 6) includes "Who," "Now," and "Elapsed" fields 612, 614, 616 in addition to the traditional fields normally provided in a user's inbox. The Who field 612 for the email message 512 to Betty identifies Betty as having been tasked with the request. The Now field 614 identifies that the current state of the email message 512 is "Considering," which indicates that the message has been received at Betty's messaging client 312, but that Betty has not yet replied. The Elapsed field 616, for example, begins at one minute and continuously increments while the dialogue is in an open state. The contents of these fields are stored and maintained in the data structures 322, 342, 330 of the messaging clients 310, 312 and messaging server 314 as part of the dialogue status 321, 344, 321. Betty's inbox is similar to Adam's except that the Who field 612 is populated with the literal string "You" and a flag is turned on in her inbox for this message 610. In this manner, both Adam and Betty can view the current status of their request dialogue.

Figure 7:
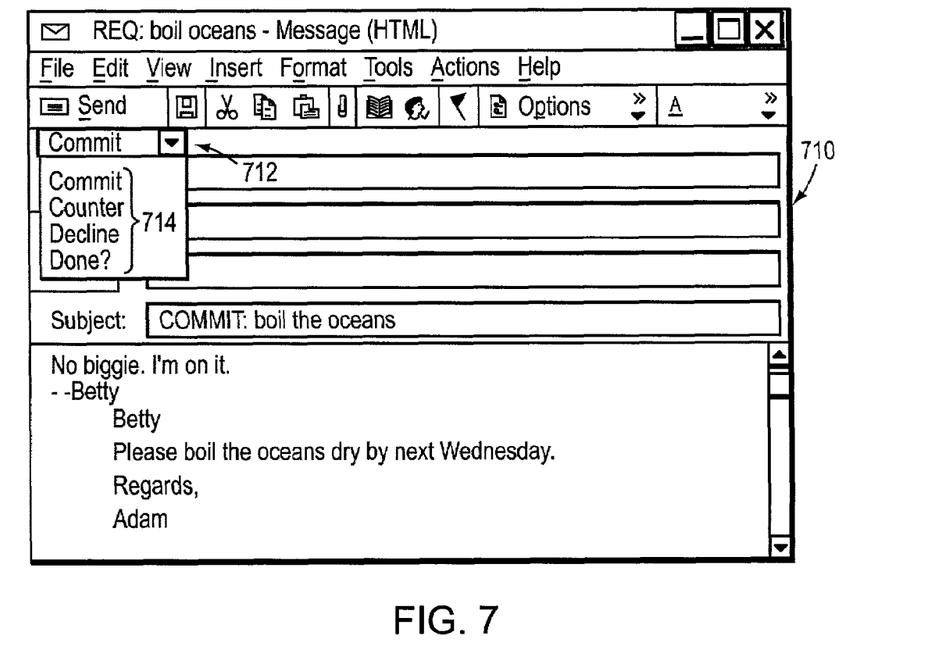
FIG. 7 provides a GUI representation of an email message responsive to the message of FIG. 5 in which a subset of valid, responsive primitives is displayed in a drop-down list box and where the selected primitive is embedded in the subject line of the responsive email message.

With reference to FIG. 7, Betty replies to Adam's email message 512 by preparing and transmitting a responsive email message 710. The primitive/dialogue-selection process 338 of messaging client 312 populates a drop-down list box 712 in the email message 710 with a set of valid primitives 714 that are appropriate for responding to Adam's email message 512 at the current stage of this Request Protocol. In the present example, Betty has selected the "Commit" primitive, which informs Adam that she has committed to performing the requested task. Betty could alternatively have selected "Done?" to indicate that she had anticipated the request and already satisfied it, "Decline" to indicate her unwillingness to undertake the request, or "Counter" to propose a revision to the request (e.g., propose an alternate due date). Indicia of these responsive primitives are similarly embedded into the subject line of the responsive email 710.

Figure 6:
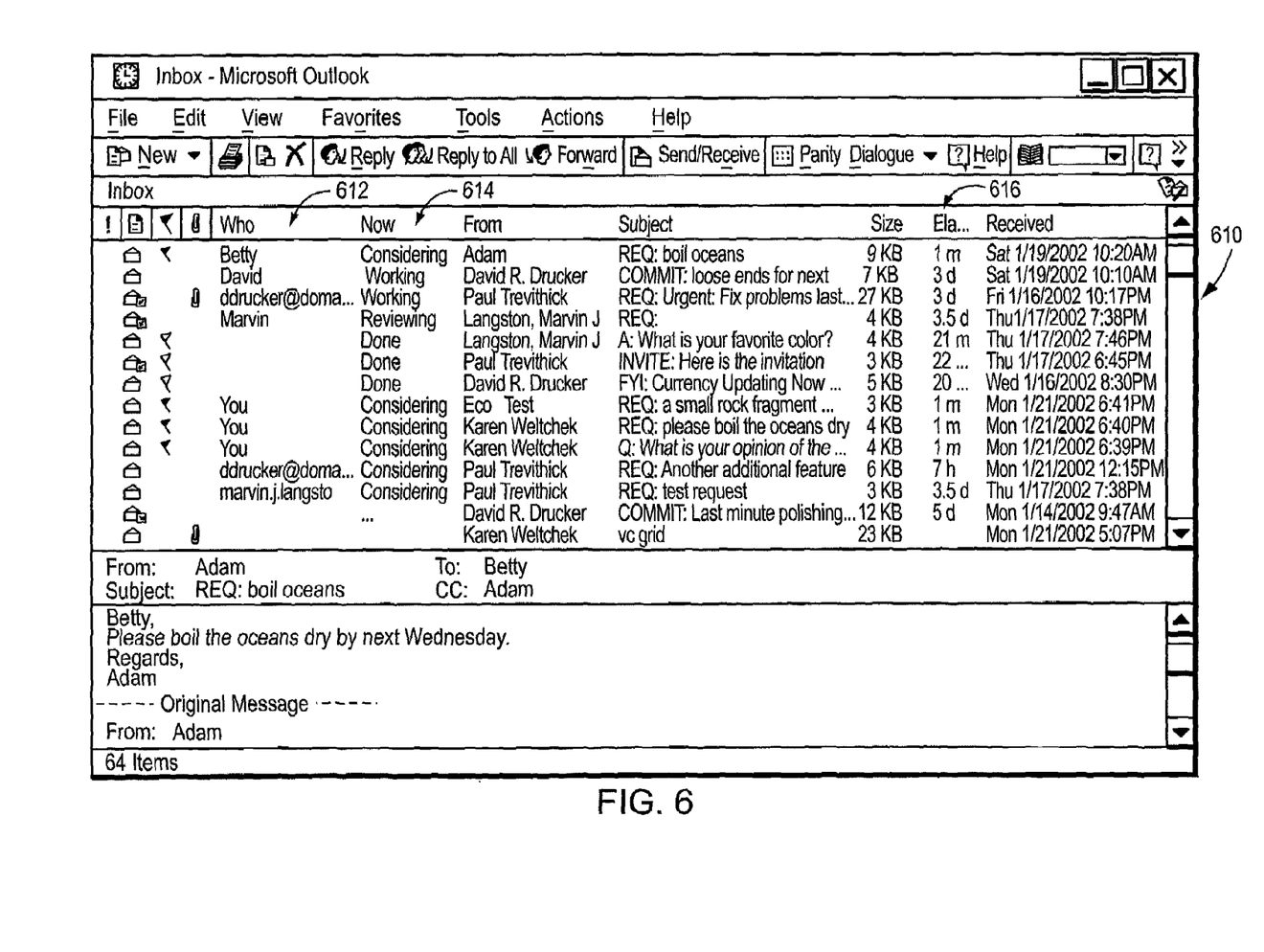
FIG. 6. provides a GUI representation of an email inbox illustrating the additional flags and fields provided by the present invention.

When Betty sends her responsive email message 710 to Adam, the Now and Elapsed fields 614, 616 of her inbox are updated to indicate that the current status of the dialogues is that Betty is "Working" on the task and that a particular period of time has passed since this email 710 was sent. This status and time information appears in Adam's inbox once Betty's message 710 is received. This information is also stored as part of the dialogue status in the data structures of the messaging clients and messaging server, as previously described. When Betty completes the task requested by Adam in his email message 512, Betty replies to Adam's original message 512 and selects "Done?" as the valid primitive. Upon transmission of this third email message, the primitive detection processes 336, 350 of the messaging clients 312, 310 update their corresponding state machines to reflect that the dialogue in now in a "Reviewing" state and that the dialogue has progressed for a particular time period. The dialogue status 321 of the messaging server 314 is also updated by the server-update processes 346, 326. The transmission of this third email message also triggers an update to Adam and Betty's inboxes to indicate who is now tasked with responding (in this case, Adam) and to set forth the current state of the dialogue (i.e., reviewing). Since the Request Protocol is now in a state that requires a response by Adam, a flag in Adam's inbox is enabled to identify that he owes something to another and the flag in Adam's original email in Betty's inbox is turned off to indicate that there is no further action due by her. The terminal state or final outcome of this Request Protocol is achieved when Adam confirms that the task is complete by sending an email to Betty with a Done primitive selected, at which time his flag for this task is also turned off and the Elapsed field 616 stops incrementing.

Figure 8:
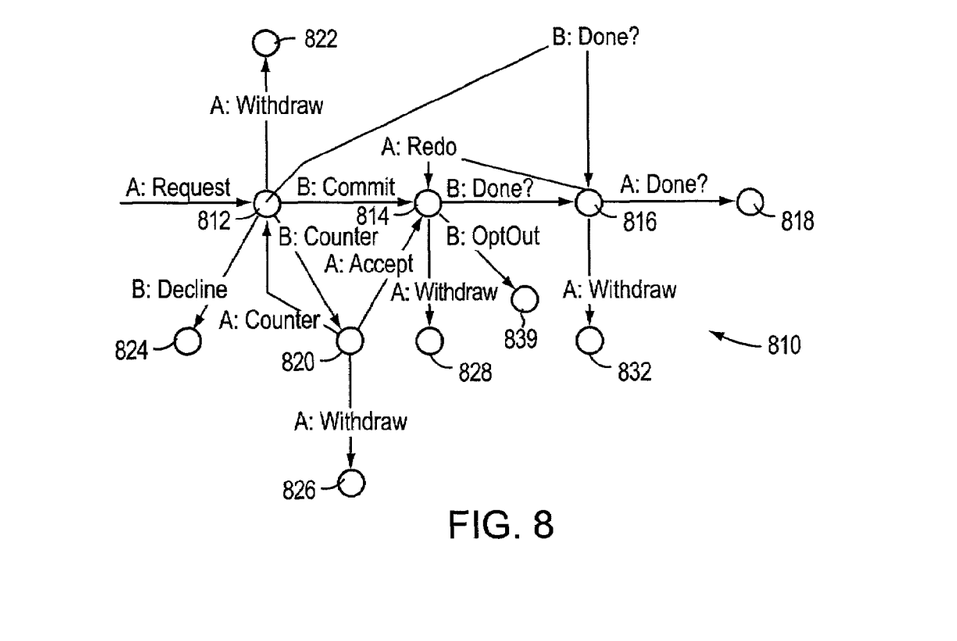
FIG. 8 illustrates exemplary paths, states, and outcomes associated with the email messages of FIGS. 5 and 7.

With reference to FIG. 8, Adam's Request Protocol can be terminated by a number of transitional paths 810. In the example provided above, Adam and Betty's dialogue progressed through a set of intermediate states 812-816 to achieve a desired closed state 818. However, the dialogue could have progressed through other intermediate states 820 and/or achieved other closed states 822-832 that are not as favorable as the desired closed state 818. As previously discussed, dialogue status information is maintained in each of the data structures of the messaging clients 310, 312 and messaging server 314 for the particular path followed by Adam and Betty. The corresponding state machines on the messaging clients 310, 312 and messaging server 314, which maintain the state information for the dialogue are substantially in lock step, subject to some jitter due to the time delay in the actual transmission time of the email messages. The individual messages transmitted during the dialogue are uniquely identified with a dialogue identifier that is embedded into each email message so as to properly associate each such message with a particular dialogue.

If Adam's request were made to multiple recipients, such as to Betty and Charlie, the invention would treat the request as two separate Request Protocols, i.e., a request from Adam to Betty and a request from Adam to Charlie. The invention also accommodates nested dialogues, where Adam makes a request of Betty (a parent request) and Betty makes a subsequent request (child request) for help on Adam's task to Charlie. Although Adam's inbox does not provide information on the child request, since this request is only communicated between Betty and Charlie, Adam can view the status of the sub-dialogues for this child request via the information provided by the group-performance process 352 to a web portal accessible to Adam. For example, Adam can sort through the available messages in the portal to identify entries with a common initiator as his message (in this case, Adam), the individual who is presently tasked with the request (Charlie), and/or the individual who owes Adam a response (Betty). Adam can also use the dialogue identifier inserted into each of the messages associated with his Request Protocol to identify all participants in the dialogue as well as obtain its current status.

Figure 9A:
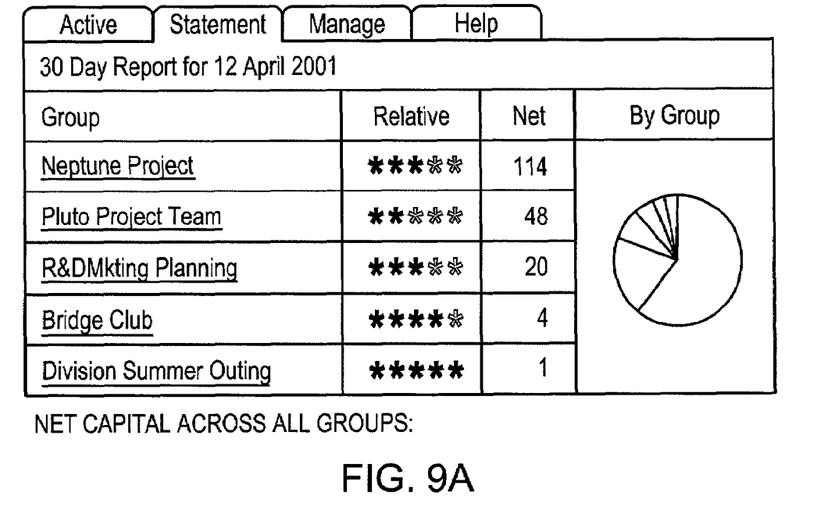
FIGS. 9A-9C provides examples of group aggregate-outcome scores, average performance metrics across all groups, and metrics associated with a particular individual's interactions within one or more groups, as provided via a web-based portal.
Figure 9B:
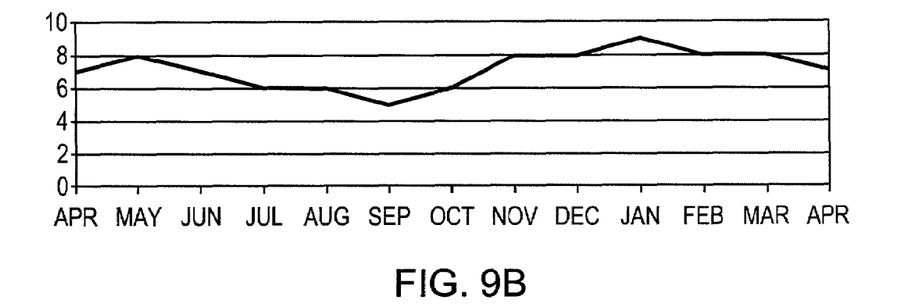
Figure 9C:
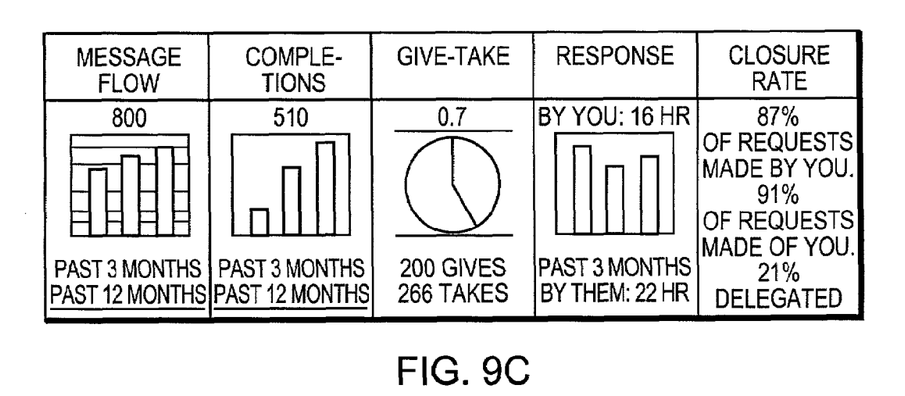

With reference to FIGS. 9A-9C, the group-performance process 352 of the messaging server 314 can display the metrics and patterns that characterize the interactions of particular groups in a web-based portal, which is accessible to the members of such groups. For example, FIG. 9A illustrates the aggregate-outcome scores (under the "Net" column) for each group of interest. In this example, the interactions among the members of the Neptune Project group have resulted in an aggregate-outcome score of 114 according to that group's conventions, which clearly surpasses the aggregate-outcome score of the Division Summer Outing group. FIG. 9B illustrates the average aggregate-outcome scores across all groups in a particular organization during a period of time. FIG. 9C illustrates some of the metrics that can be gathered for a particular member in each of and/or across all groups in which the particular member is associated, and the different manners in which these may be presented.

Although the invention has been described as operating in a peer-to-peer architecture with each messaging client 310, 312 exhibiting substantially the same functionality, the invention can also be implemented by incorporating one or more of the processes executing on the messaging clients 310, 312 into the messaging server 314. Further, the functionality of a particular software process can be combined with or dispersed across one or more one or more different software processes.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method of characterizing social relationships among members of a social network, the method comprising the steps of:
   receiving a plurality of messages communicated during a dialogue between two members of a social network;
   determining a purpose for each of the messages corresponding to one or more speech acts within the dialogue between the two members which characterize the content of the messages;
   determining a status of the dialogue and updating the dialogue status as the dialogue progresses including determining an outcome of the dialogue;
   determining at least one pattern in the messages communicated during the dialogue corresponding to one or more types of interaction between the two members of the social network; and
   objectively characterizing quality of the social relationship between the two members of the social network based on analysis of the pattern and purposes of the messages, the dialogue status, and the dialogue outcome, for optimizing the social relationship and performance of the two members of the social network.

2. The method of claim 1 further comprising the steps of: selecting one of a plurality of purpose categories; and embedding indicia of the selected purpose category in at least one of the plurality of messages.

3. The method of claim 2 further comprising the step of determining the purpose of at least one of the plurality of messages by extracting the indicia therefrom.

4. The method of claim 1 further comprising the step of determining the purpose of each of the messages by extracting indicia of such purpose from a body section of each message.

5. The method of claim 1 further comprising the step of determining the purpose of each of the messages by extracting indicia of such purpose from a header section of each message.

6. The method of claim 1 wherein at least one of the messages is an electronic mail message.

7. The method of claim 1 wherein the purpose determined for each of the messages is selected from speech acts including at least one of: a note, an acknowledgement, a counter, a reverse counter, a complete, a commit, an acceptance, a decline, an offer, an invitation, a withdrawal, an opt-out, a request, and a question.

8. The method of claim 1 wherein the pattern in the messages corresponds to types of interactions between the members of the social network selected from at least one of: a frequency of interaction, a latency in response, a latency in completion, a successful completion ratio, a nonresponsive ratio, an unsuccessful ratio, and a number of participating members until completion.

9. The method of claim 1 further comprising the step of analyzing the purpose for each of the messages to determine the pattern in the messages.

10. The method of claim 1 further comprising the step of classifying an outcome for each of the messages as one of a favorable, unfavorable, and neutral type.

11. The method of claim 10 further comprising the step of assigning a score to each of the members of the social network participating in the dialogue, the score assigned to each participating member being based at least in part on an outcome determined for each of the messages transmitted by that participating member.

12. The method of claim 11 further comprising the steps of:
   incrementing the score assigned to a particular one of the participating members in response to favorable outcomes associated with messages transmitted by that particular participating member; and
   decrementing the score assigned to the particular participating member in response to unfavorable outcomes associated with messages transmitted by that particular participating member.

13. The method of claim 10 further comprising the steps of:
   repeating each of the steps for a plurality of dialogues between the members of the social network; and
   assigning a score to each of the members of the social network based on the outcomes of the messages transmitted by each such member during the plurality of dialogues.

14. The method of claim 13 further comprising the step of using the scores and characterized relationships of the members to select members of a new social network.

15. A system for characterizing social relationships among members of a social network, the system comprising:
   a message transmission-reception process receiving a plurality of messages communicated during a dialogue between two members of a social network;
   a primitive-dialogue selection process to determine a dialogue status and update the dialogue status as the dialogue progresses including determining an outcome of the dialogue;
   a primitive-detection process determining a purpose for each of the messages, said purpose corresponding to one or more speech acts within the dialogue between the two members which characterize the content of the messages;
   a pattern-detection process determining at least one pattern in the messages communicated during the dialogue, said at least one pattern corresponding to one or more types of interaction between the two members of the social network; and
   a group-performance process objectively characterizing quality of the social relationships between the two members of the social network based on analysis of the pattern and purposes of the messages, the dialogue status, and dialogue outcome, for optimizing the social relationships and performance of the two members of the social network.

16. The system of claim 15 in which the primitive/dialogue-selection process selects one of a plurality of purpose categories and embedding indicia of the selected purpose category in at least one of the plurality of messages.

17. The system of claim 15 wherein the primitive-detection process determines the purpose of each of the messages by extracting indicia of such purpose from a body section of each message.

18. The system of claim 15 wherein the primitive-detection process determines the purpose of each of the messages by extracting indicia of such purpose from a header section of each message.

19. The system of claim 15 wherein at least one of the messages is an electronic mail message.

20. The system of claim 15 wherein the purpose for each of the messages determined by the primitive-detection process corresponds to speech acts including at least one of: a note, an acknowledgement, a counter, a reverse counter, a complete, a commit, an acceptance, a decline, an offer, an invitation, a withdrawal, an opt-out, a request, and a question.

21. The system of claim 15 wherein the pattern in the messages determined by the pattern-detection process corresponds to types of interaction including at least one of: a frequency of interaction, a latency in response, a latency in completion, a successful completion ratio, a nonresponsive ratio, an unsuccessful ratio, and a number of participating members until completion.

22. The system of claim 15 wherein the pattern-detection process analyzes the purpose of each of the messages to determine the pattern in the messages.

23. The system of claim 15 wherein the pattern-detection process classifies outcomes of each of the messages as one of a favorable, unfavorable, and neutral type.

24. The system of claim 15 wherein the pattern-detection process assigns a score to each of the members of the social network participating in the dialogue, the score based at least in part on an outcome of each of the messages transmitted by that participating member.

25. The system of claim 24 wherein the group-performance process:

increments the score assigned to a particular one of the participating members in response to favorable-type outcomes associated with messages transmitted by that particular participating member; and decrements the score assigned to the particular participating member in response to unfavorable outcomes associated with messages transmitted by that particular participating member.

26. The system of claim 15 wherein the group-performance process assigns a score to each of the members of the social network based on the outcomes of the messages transmitted by each such member during a plurality of dialogues.

27. The system of claim 26 wherein the scores and characterized relationships of the members are used to select members of a new social network.

28. A method of characterizing social relationships among a plurality of members of a social network, the method comprising the steps of:

receiving a plurality of messages communicated during dialogues between members of a social network;

determining a purpose for each of the messages corresponding to one or more speech acts within a dialogue between a pair of members of the social network which characterize the content of the messages between the pair of members;

determining a status of the dialogue between the pair of members and updating the dialogue status as the dialogue progresses including determining an outcome of the dialogue;

determining at least one pattern in the messages communicated during the dialogue corresponding to one or more types of interaction between the pair of members of the social network; and objectively characterizing quality of the social relationships among the plurality of members of the social network based on analysis of the patterns and purposes of messages between a number of pairs of members, and the status and outcome of dialogues between the number of pairs of members, for optimizing the social relationships and performance of the plurality of members of the social network.

* * * * *